(12) United States Patent
Sukhman et al.

(10) Patent No.: US 9,346,122 B1
(45) Date of Patent: May 24, 2016

(54) MULTI-WAVELENGTH LASER PROCESSING SYSTEMS AND ASSOCIATED METHODS OF USE AND MANUFACTURE

(71) Applicant: Universal Laser Systems, Inc., Scottsdale, AZ (US)

(72) Inventors: Yefim P. Sukhman, Scottsdale, AZ (US); Christian J. Risser, Scottsdale, AZ (US); Mikhail E. Ryskin, Phoenix, AZ (US); Stefano J. Noto, Mesa, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 684 days.

(21) Appl. No.: 13/736,899

(22) Filed: Jan. 8, 2013

(51) Int. Cl.
*B23K 26/04* (2014.01)
*B23K 26/00* (2014.01)

(52) U.S. Cl.
CPC ....................................... *B23K 26/00* (2013.01)

(58) Field of Classification Search
CPC ........... B23K 26/0604; B23K 26/0608; B23K 26/0626; B23K 26/0639; B23K 26/067; B23K 26/0673; B23K 26/0676; B23K 26/064; B23K 26/0648
USPC ............... 219/121.6–121.64, 121.67–121.72, 219/121.78–121.82, 121.76–121.77; 372/50.12, 50.121, 50.122
See application file for complete search history.

(56) References Cited

U.S. PATENT DOCUMENTS

| | | | |
|---|---|---|---|
| 4,494,235 A | 1/1985 | Guch, Jr. et al. | |
| 4,689,482 A | 8/1987 | Horikawa et al. | |
| 4,707,584 A | 11/1987 | Kimbara | |
| 4,949,100 A | 8/1990 | Hidaka | |
| 6,031,201 A * | 2/2000 | Amako | B23K 26/063 219/121.68 |
| 7,460,571 B2 | 12/2008 | Hattori | |
| 2002/0021723 A1 | 2/2002 | Amako et al. | |
| 2006/0231051 A1* | 10/2006 | Winstead | F01L 9/04 123/90.11 |
| 2006/0255023 A1* | 11/2006 | Jurgensen | B23K 26/0604 219/121.69 |
| 2008/0023447 A1* | 1/2008 | Holmgren | B23K 26/04 219/121.6 |
| 2009/0114629 A1* | 5/2009 | Gross | B23K 26/067 219/121.77 |
| 2009/0314755 A1* | 12/2009 | Chung | B23K 26/0608 219/121.77 |
| 2011/0186555 A1* | 8/2011 | Bruland | B23K 26/0613 219/121.75 |
| 2011/0259631 A1 | 10/2011 | Rumsby | |
| 2014/0027417 A1* | 1/2014 | Simon | B23K 26/0042 219/121.65 |

* cited by examiner

*Primary Examiner* — Dana Ross
*Assistant Examiner* — Lindsey C Teaters
(74) *Attorney, Agent, or Firm* — Perkins Coie LLP

(57) ABSTRACT

Laser processing systems for processing one or more materials or combination of materials with composite laser energy and associated systems and methods are disclosed herein. In several embodiments, for example, a laser processing system includes one or more laser sources that provide a first plurality of first laser beams and preconditioning optics that combine the first laser beams into a first composite beam. The system also includes recomposition optics that separate the first composite beam into second plurality of second laser beams and combine the second laser beams into a second composite beam. The system further includes beam modification optics that modify wave fronts of one or more of the individual second laser beams such that the second composite beam has one or more beam characteristics that are modified relative to corresponding beam characteristics of the first composite beam. For example, the second laser beams of the second composite beam can focus at a common focusing plane.

41 Claims, 6 Drawing Sheets

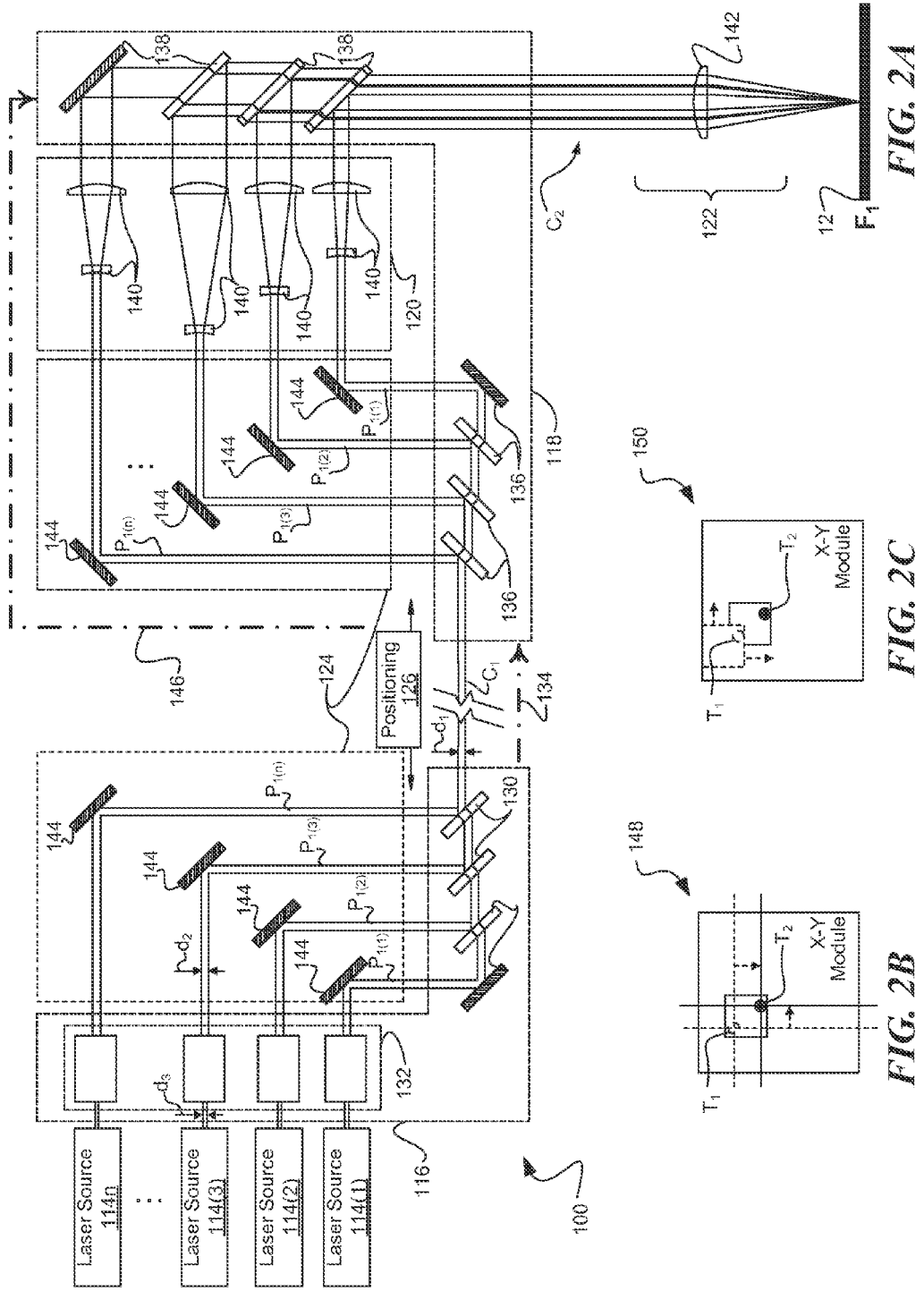

MULTI-WAVELENGTH LASER PROCESSING SYSTEMS AND ASSOCIATED METHODS OF USE AND MANUFACTURE

TECHNICAL FIELD

The present disclosure is directed generally to laser processing systems and, more specifically, to laser processing systems that employ laser beams having different wavelengths.

BACKGROUND

Laser processing systems are being adopted in manufacturing for material processing at an ever increasing rate. Laser processing offers many advantages over more conventional processing techniques. For example, laser processing is particularly suited for cutting shapes or profiles out of materials, marking or preparing materials by removing or modifying surface layers of materials, and welding or sintering materials, because it offers the advantage of providing non-contact, tool-less, and fixture-less methods of processing materials. In many cases, laser processing is replacing processes that require investments in tooling such as dies for die cutting, masks for silk screening, or templates and fixtures for hard tooling.

BRIEF DESCRIPTION OF THE DRAWINGS

FIGS. 2A-3B are schematic views of laser processing systems configured in accordance with selected embodiments of the present technology.

DETAILED DESCRIPTION

Figure 1:
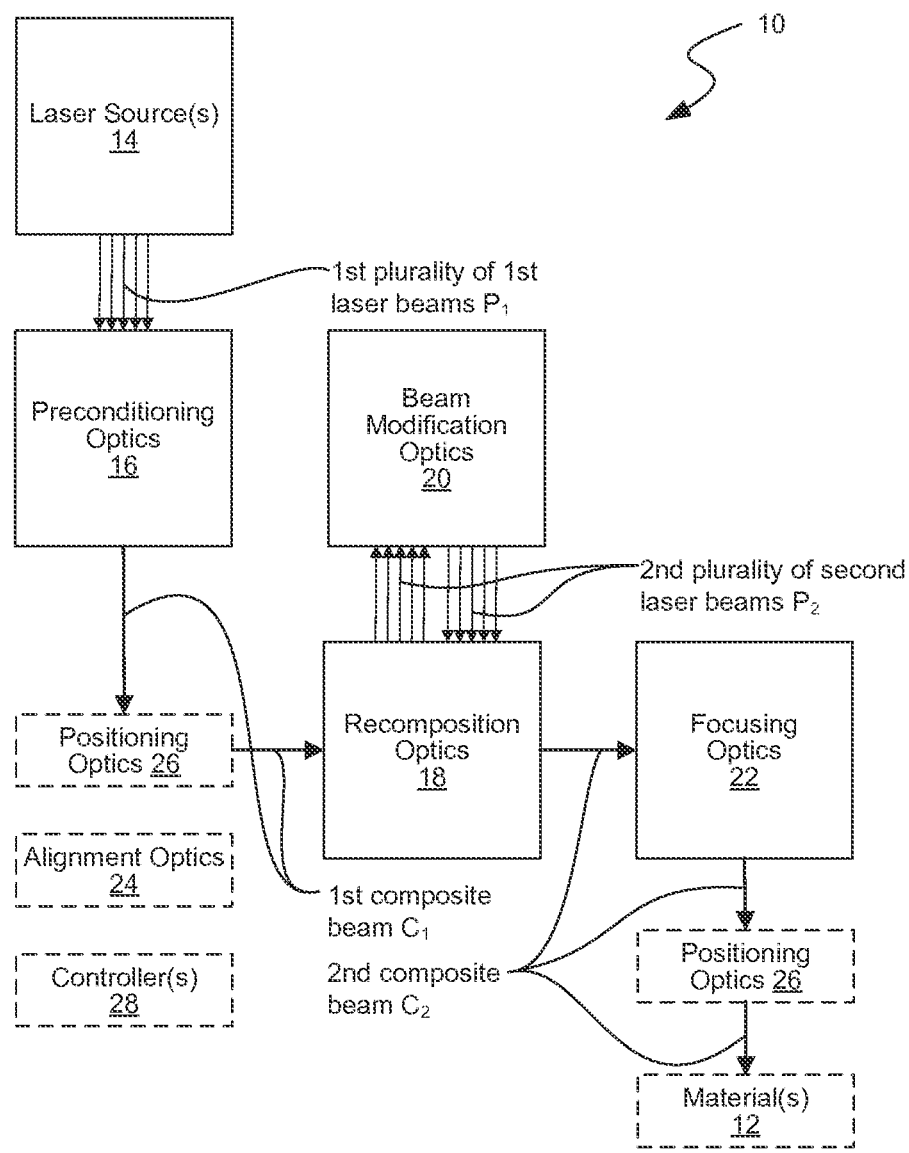
FIG. 1 is a block diagram of a laser processing system configured in accordance with selected embodiments of the present technology.

The following disclosure describes various embodiments of systems and methods for operating and controlling laser processing systems. Certain details are set forth in the following description and in FIGS. 1-6 to provide a thorough understanding of various embodiments of the disclosure. Other details describing well-known structures and systems often associated with laser processing systems and methods for forming and using such systems, are not set forth in the following disclosure to avoid unnecessarily obscuring the description of the various embodiments of the disclosure.

Depending upon the context in which it is used, the term "optical element" can refer to any of a variety of structures that can direct, transmit, steer, shape, or otherwise modify or influence laser radiation. In general, the term "optical element" can refer to different structures that provide generally similar functions. In addition, optical elements can have any of a variety of shapes or configurations depending on cost, efficiency, or other parameters of an optical system. For example, in some embodiments a conventional spherical lens can be replaced with a Fresnel lens (or vice-versa). Further, unless clearly indicated by the context, the use of a specific term in the disclosure to describe an optical element (e.g., a lens, mirror, etc.) does not limit the optical element to that particular structure or device. The term "optics" as used herein can refer to a discrete arrangement of optical elements that can optionally include electrical components, mechanical components, or other suitable components.

As used herein, the word "or," unless expressly stated to the contrary, means any single item in a list of items, all of the items in the list, or any combination of the items in the list. The expression "an embodiment," or similar formulations thereof, means that a particular feature or aspect described in connection with the embodiment can be included in at least one embodiment of the present technology. For ease of reference, identical reference numbers are used herein to identify similar or analogous components or features; however, the use of the same reference number does not imply that the parts should be construed to be identical. Indeed, in many examples described herein, identically-numbered parts are distinct in structure or function.

Many of the details, dimensions, angles, or other portions shown in the Figures are merely illustrative of particular embodiments of the technology and may be schematically illustrated. As such, the schematic illustration of the features shown in the Figures is not intended to limit any structural features or configurations of the processing systems disclosed herein. Accordingly, other embodiments can have other details, dimensions, angles, or portions without departing from the spirit or scope of the present disclosure. In addition, further embodiments of the disclosure may be practiced without several of the details described below, while still other embodiments of the disclosure may be practiced with additional details or portions.

Laser processing systems configured in accordance with the present technology provide composite laser energy for processing one or more material or combination of materials. A composite beam comprises individual laser beams configured to provide the composite beam with beam characteristics suitable for processing the material(s). For example, the beam characteristics can be suited for processing a combination of materials that include mirrored acrylic, polyoxymethylene or acetal homopolymer sold under the trademark DELRIN®, printed circuit boards, or other materials or combination of materials. Conventional laser processing systems, by contrast, typically employ a single laser beam for material processing. The beam characteristics of the single laser can be ill suited or not ideal for processing a particular material. For example, a single laser may be effective for processing one material in a combination of materials, but damage other materials in the combination. In addition, conventional laser processing systems are not suited to combine laser beams having substantially different beam characteristics. For example, infrared laser beam sources can have substantially different wavelengths (e.g., on the order of more than 50 microns), which results in significantly different distances between focal planes for different wavelengths. Also, these lasers sources can produce laser beams which focus to different spot sizes at the focal plane.

FIG. 1 is a block diagram of a laser processing system 10 for processing material(s) 12 with composite laser energy configured in accordance with an embodiment of the present technology. The laser system 10 includes one or more laser sources 14, preconditioning optics 16, recomposition optics 18, beam modification optics 20, focusing optics 22, alignment optics 24, positioning optics 26, and one or more controllers 28.

The laser sources 14 are configured to provide a first plurality of individual first laser beams $P_1$ having beam characteristics that are substantially different than the corresponding characteristics of other individual first laser beams. For example, two or more of the first laser beams can have different wavelengths or states of polarization. Additionally or alternatively, two or more of the first laser beams can have different beam diameters, operating power, pulsing frequencies, or waveform shapes.

The preconditioning optics 16 are arranged to combine the individual first laser beams of the first plurality of first laser beams $P_1$ into a first composite beam $C_1$, such as by selective transmission or selective reflection. In some embodiments, the preconditioning optics 16 can also expand, reduce, or collimate one or more of the individual first laser beams within the first plurality of first laser beams $P_1$.

The recomposition optics 18 are arranged to separate the first composite beam $C_1$ into a second plurality of second laser beams $P_2$ and combine the second individual laser beams into a second composite beam $C_2$. For example, selective transmission or selective reflection can be used to separate the first composite beam $C_1$ and combine the second individual laser beams.

The beam modification optics 20 are arranged to modify wave fronts of one or more of the second individual laser beams within the second plurality of second laser beams $P_2$ such that the second composite beam $C_2$ has one or more beam characteristics that are modified relative to corresponding beam characteristics of the first composite beam $C_1$. The modified beam characteristics can include, for example, modification to a convergence, a divergence, a focal length, or a beam size, to name a few examples.

The focusing optics 22 is arranged to focus the second individual laser beams of the second composite beam $C_2$ within a common focusing plane. In particular, the focusing optics 22 can focus the second individual laser beams at a common focal plane in close proximity to material(s) to be laser processed 12.

Other components of the laser processing system 10 can include the alignment optics 24, the positioning optics 26, and the controllers 28. The alignment optics 24 is configured to align individual laser beams or composite beams within the laser processing system 10. The positioning optics 26 is arranged to dynamically adjust one or more optical paths of composite or individual beams in the system 10 for delivery of such beams to different locations in the system 10. The controllers 28 can control various aspects of the system 10, such as operation of the laser sources 14 or control of optical paths in the system 10 (e.g., via the positioning optics 26). A person having ordinary skill in the art will recognize that the alignment optics 24, the positioning optics 26, and the controllers 28 can be variously distributed throughout the laser processing system 10, and are thus not limited to the locations shown in the Figures.

FIGS. 2A-2C are schematic views of a laser processing system 100 configured in accordance with another embodiment of the present technology. The system 100 can include a number of aspects that are similar to the laser processing system 10 described with reference to FIG. 1. As shown in FIG. 2A, for example, the processing system 100 includes laser sources 114 (identified individually as #1 through #n laser sources 114(1)-114(n)), preconditioning optics 116, recomposition optics 118, beam modification optics 120, focusing optics 122, alignment optics 124, and positioning optics 126.

The laser sources 114 can include any of a variety of radiation or other laser-based material processing tools known in the art. These may include, for example, a gas laser, a solid-state laser, a semiconductor laser, a dye laser, or a fiber laser. A person having ordinary skill in the art will recognize that the nature of individual laser sources may depend upon the intended application for the laser processing system 100. For example, in a system used for marking material(s) 12, one laser source can be a carbon dioxide gas laser and another laser source can be an Nd:YAG laser. In other embodiments, other suitable types of laser sources may be used.

In operation, the laser sources 114 provide the first plurality of first laser beams $P_1$ (first laser beams are identified individually as #1 through #n first laser beams $P_{1(1)}$-$P_{1(n)}$). In particular, the individual laser beams of the first plurality of first laser beams $P_1$ are configured to have one or more substantially different beam characteristics relative to other laser beams of the first plurality of first laser beams $P_1$. For example, one or more of the individual laser beams of the first plurality of first laser beams $P_1$ can have different wavelengths or states of polarization. Additionally or alternatively, one or more of the individual laser beams of the first plurality of first laser beams $P_1$ can have different beam diameters, operating power, pulsing frequencies, or waveform shapes. In some embodiments, the controllers 28 can be used to at least partially define the different beam characteristics of the individual laser beams of the first plurality of first laser beams $P_1$. For example, the controllers 28 (FIG. 1) can independently modulate the individual laser beams of the first plurality of first laser beams $P_1$. In another embodiment, the controllers 28 can control the operating power of the individual laser beams of the first plurality of first laser beams $P_1$ individually or collectively. In further embodiments, the controllers 28 control at least one of an on/off/stand-by state, a pulsing frequency, or a waveform shape of one or more of the first individual laser beam of the first plurality of first laser beams $P_1$ individually or collectively.

The preconditioning optics 116 include first optical elements 130 and optionally second optical elements 132. The first optical elements 130 are arranged to combine the first laser beams of the first plurality of first laser beams $P_1$ by selective transmission or selective reflection. In general, suitable optical elements for selective transmission and reflection can be configured to combine by wavelength or polarization state. For example, such optical elements can include lenses, coatings, or other structures that reflect a laser beam polarized in a first direction, while transmitting another laser beam polarized in a second direction different than the first direction (e.g., perpendicular to the first direction). Additionally or alternatively, suitable optical elements for selective transmission and reflection can include dichroic or multichroic coatings that selectively reflect and selectively transmit a certain range of wavelengths. In some embodiments, suitable optical elements can include a grating structure with slots configured for selective transmission and reflection of certain wavelengths.

The first optical elements 130 of the preconditioning optics 116 can also be configured to align the individual laser beams of the first plurality of first laser beams $P_1$ such that the first composite beam $C_1$ is substantially concentric with one or more of the individual laser beams of the first plurality of first laser beams $P_1$. For example, an outer diameter $d_1$ of the first composite beam $C_1$ can be equal to the largest beam diameter within the individual laser beams of the first plurality of first laser beams $P_1$ (e.g., beam diameter $d_2$).

The second optical elements 132 of the preconditioning optics 116 can include, for example, one or more expanding elements, reducing elements, or collimating elements. Such second optical elements 132, in operation, can expand, reduce, or collimate one or more of the individual laser beams of the first plurality of first laser beams $P_1$ to achieve a particular beam shape or diameter. For example, a beam diameter $d_3$ of the first composite beam $P_{N3}$ can be reduced to the beam diameter $d_2$ and collimated for delivery of the first composite beam $C_1$ over an optical path 134 between preconditioning optics 116 and the recomposition optics 118. As will be described in further detail below, the beam diameter can then be expanded to its original size or expanded or reduced to a different size.

In one embodiment, aspects of suitable preconditioning optics and their operation are disclosed, for example, in U.S. Pat. No. 6,423,925, issued Jul. 23, 2002, and entitled "APPARATUS AND METHOD FOR COMBINING MULTIPLE LASER BEAMS IN LASER MATERIAL PROCESSING SYSTEMS," which is incorporated by reference herein in its entirety. In other embodiments, the preconditioning optics 116 include optical elements and configurations thereof that are in addition to or in lieu of those described in U.S. Pat. No. 6,423,925.

The recomposition optics 118 include third optical elements 136 and fourth optical elements 138. The third optical elements 136, for example, separate (e.g., split) the first composite beam $C_1$ into individual laser beams to form the second plurality of second laser beams $P_2$ (second laser beams are identified individually as #1 through #n second laser beams $P_{2(1)}$-$P_{2(n)}$). The fourth optical elements 138 combine the individual laser beams of the second plurality of second laser beams $P_2$ into the second composite beam $C_2$ after modification by the modification optics 120 (described below). The third and fourth optical elements 136 and 138 can include optical elements suited for selective transmission or selective reflection, such as those described above with reference to the preconditioning optics 116. Also, and similar to the first optical elements 130 of the preconditioning optics 116, the third and fourth optical elements 136 and 138 can be arranged such that the second composite beam $C_2$ is substantially concentric with one or more of the individual laser beams of the second plurality of second laser beams $P_2$.

In one embodiment, the optical elements and techniques for separating the individual laser beams of the second plurality of laser beams $P_2$ are similar to those used for combining the individual laser beams of the second plurality of laser beams $P_2$. For example, for a given optical path of an individual laser beam of the second plurality of second laser beams $P_2$, the third and fourth optical elements 136 and 138 can selectively transmit or reflect similar ranges of wavelengths or polarization states along the optical path. Similarly, in some embodiments, the optical elements and techniques for combining the individual laser beams of the second plurality of second laser beams $P_2$ at the beam modification optics 118 can be similar to those used for combining the individual laser beams of the first plurality of first laser beams $P_1$ at the preconditioning optics 116. In other embodiments, however, the beam modification optics 118 or the preconditioning optics 116 may employ different types of optical elements and techniques for selective transmission or selective reflection of individual laser beams. For example, for a given optical path of an individual laser beam, the first, third, or fourth optical elements 130, 136, 138 can selectively transmit or reflect different wavelengths or states of polarization along the optical path.

The beam modification optics 120 include fifth optical elements 140 arranged to modify the wave fronts of one or more of the laser beams of the second plurality of second laser beams $P_2$. For example, the fifth optical elements 140 can expand, reduce, or collimate one or more of the individual laser beams of the second plurality of second laser beams $P_2$. The expansion, reduction, or collimation can introduce a particular convergence/divergence in order to achieve a desired focal length, or spot size of the individual laser beams of the second plurality of second laser beams $P_2$ at the focal plane $F_1$ of the material(s) 12 (described in more detail below with reference to FIGS. 5A and 5B). In additional or alternative embodiments, the beam modification optics 120 can be configured to modify other beam characteristics of one or more of the individual laser beams of the second plurality of second laser beams $P_2$.

The focusing optics 122 include one or more sixth optical elements 142 (shown as an individual focus lens) configured to focus the individual laser beams of the second composite beam $C_2$. Suitable optical elements of the focusing optics 122 can include, for example, a plano-convex lens (as shown), a meniscus lens, a focusing reflective element, or an assembly of lenses or reflective elements.

The alignment optics 124 include seventh optical elements 144 configured for aligning or directing individual laser beams or composite beams within the laser processing system 100. For example, the alignment optics 124 can direct the individual laser beams of the second plurality of second laser beams $P_2$ along an optical path 146 that extends from the recomposition optics 118, to the modification optics 120, and back to the recomposition optics 118.

The positioning optics 126 can include optical elements (e.g., reflective elements; not shown) and a linear or multi-dimensional positioning module 148 (show in the top-plan view of inset FIG. 2B) connected to or otherwise configured to carry the optical elements. In operation, the positioning optics 126 can dynamically change the length of one or more segments of the optical path 134 of the first composite beam $C_1$ such that the second composite beam $C_2$ can be directed to various locations at the material(s) 12. For example, as shown in FIG. 2B, the positioning module 148 can move the second composite beam $C_2$ along X/Y axis from a first target location $T_1$ to a second target location $T_2$. In some embodiments, the positioning optics 126 can communicate with the controllers 28 (FIG. 1). For example, the controllers 28 can control the positioning module 148 to move the second composite beam $C_2$ across a surface of the material(s) 12 or change the on/off/stand-by state of the first composite beam $C_1$ as the positioning optics move the second composite beam $C_2$ to different target locations. In these and other embodiments, an assembly of optics (or portion thereof) can be configured to move during operation. Examples of such moveable arrangements are disclosed, for example, in U.S. Pat. No. 7,060,934, issued Jun. 13, 2006, and entitled "HIGH RESOLUTION LASER BEAM DELIVERY APPARATUS," which is incorporated by reference herein in its entirety.

In some embodiments, and referring to the top-plan view shown in inset FIG. 2C, the positioning optics 126 can be omitted, and a positioning stage 150 (e.g., a chuck) can have one or more linear or rotational component that move the material(s) 12 into various target positions in line with the second composite beam $C_2$. As such, the optical path 134 can be invariable, while the material(s) 12 move between first target and second target locations $T_1$ and $T_2$. In other embodiments, the positioning stage 150 can work in combination with the positioning optics 126. For example, the positioning stage 150 and the positioning module 148 of the positioning optics 126 can provide different resolutions of movement (e.g., course movement vs. fine movement) of the second composite beam $C_2$ over the material(s) 12.

Figures 3A, 3B:
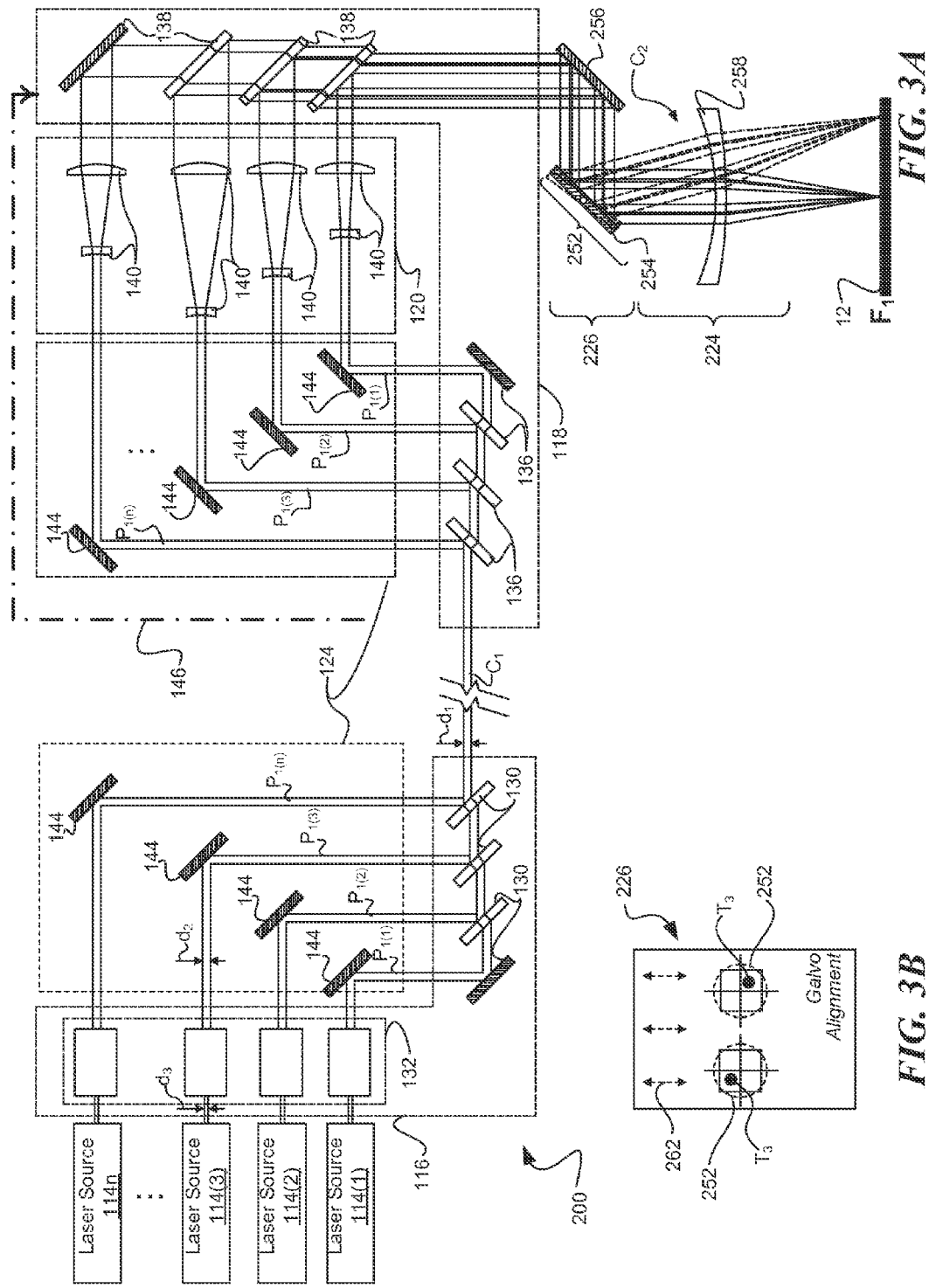

FIGS. 3A and 3B are schematic views of a laser processing system 200 configured in accordance with still another embodiment of the present technology. The laser processing system 200, for example, includes a number of features similar to the laser processing system 100 of FIG. 2A, but includes positioning optics 226 and focusing optics 224 in lieu of, respectively, the positioning optics 126 and focusing optics 124 of FIG. 2A. The positioning optics 226 include a scanning galvanometer 252 having a stationary element 256 and a beam-steering element 254. The focusing optics 224 include a an F-theta lens 258 that is aligned with the beam-steering element 254. In some embodiments, the positioning optics 226 can include additional or alternative optical elements or components. For example, the F-theta lens 258 can be replaced by a telecentric lens in some embodiments.

In operation, the galvanometer 252 operates in combination with the F-theta lens 258 to dynamically change the optical path of the second composite beam $C_2$. In particular, the F-theta lens 258 is configured such that the individual laser beams $P_2$ of the second composite beam $C_2$ generally focus at the focal plane $F_1$ at the material(s) 12. The beam-steering element 254 can be rotated (e.g., via a motor) to variously position the second composite beam $C_2$ at the focal plane $F_1$ for processing the material(s) 12. In one embodiment, the second composite beams $P_2$ are commonly located in a first plane that is transverse to the focal plane $F_1$. As such, the second composite beams $P_2$ can move along a linear path to process the material(s) 12. In other embodiments, the galvanometer 252 is configured to scan the second composite beams $P_2$ in two dimensions at the focal plane $F_1$.

In some embodiments, and referring to the top-plan view shown in inset FIG. 3B, single or multiple (as shown) scanning galvanometers 252 can process the material(s) 12 by steering the second composite beams $P_2$ in a first plane as the material(s) 12 travel along a conveyor 262 in a second plane that is generally transverse to the first plane. The conveyor 262 can work in combination with the galvanometers 252 to achieve a particular pattern at the material(s) 12 (e.g., by moving forward/backward or remaining stationary). In other embodiments, the scanning galvanometers 252 can steer the second composite beams $P_2$ in two-dimensions (as described above) in combination with the movement at the conveyer 262. It is expected that in either of these configurations, the system 200 could be configured for higher throughput relative to the system 100 of FIGS. 2A-2C.

Figure 4:
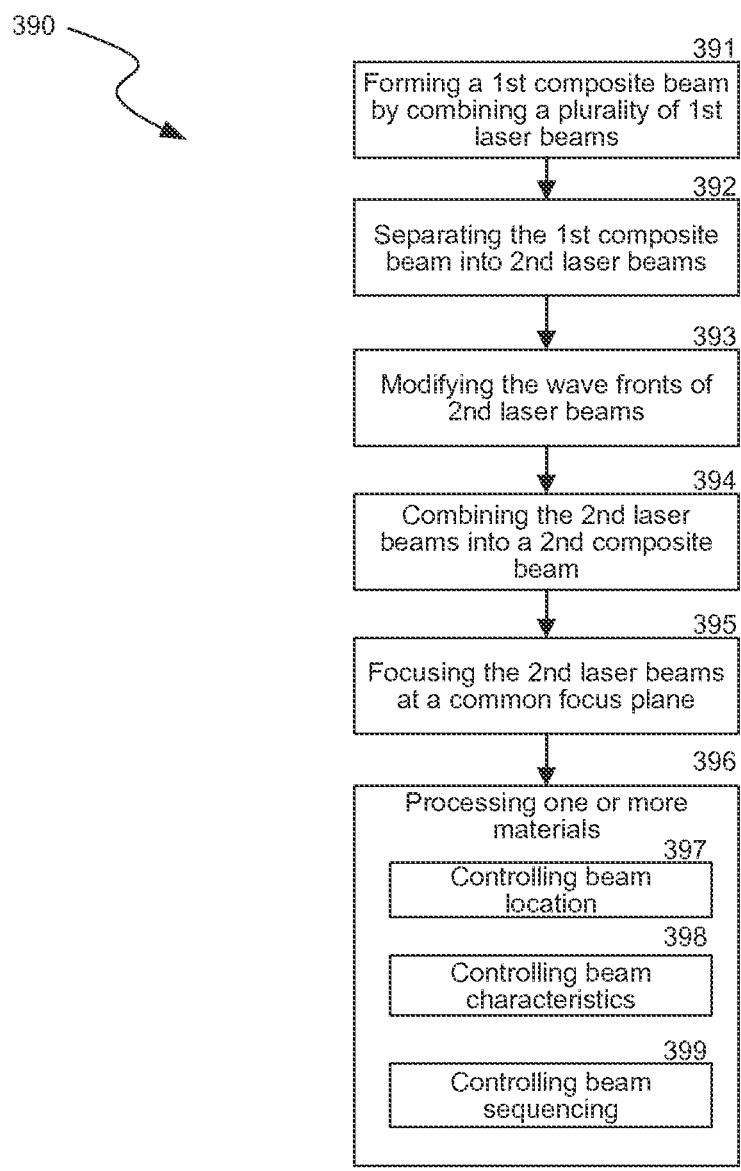
FIG. 4 is a flow diagram of a method for operating a laser processing system configured in accordance with selected embodiments of the present technology.

FIG. 4 is a flow diagram of a process or method 390 configured in accordance with embodiments of the disclosure for controlling a laser processing system. The method 390 can be performed, for example, by using any of the systems and associated components described herein, or other suitable laser systems. The method 390 includes forming a first composite beam by combining a plurality of first laser beams from one or more laser sources, where individual first laser beams have beam characteristics that are substantially different from corresponding beam characteristics of other first laser beams (block 391). As discussed above, the different beam characteristics can include, a wavelength, a state of polarization, a beam diameter, a power, a pulsing frequency, or a waveform shape.

The method 390 further includes separating the first composite beam into individual second laser beams (block 392), modifying wave fronts of at least a portion of the individual second laser beams (block 393), and combining the individual second laser beams, including the individual second laser beams with modified wave fronts, into a second composite beam (block 394). The second composite beam has different characteristics than the first composite beam due to the modified wave fronts of at least some of the second laser beams. As discussed above, the modified wave fronts can provide the second laser beams of the second composite beam with a common spot size or common focal length when focused (block 395). Various embodiments for modifying the wave front of the second laser beams are described in more detail below with reference to FIGS. 5A and 5B.

The method 390 can further include focusing the second laser beams of the second composite beam within a common focusing plane at the material(s) to be processed (block 395). The method 390 can also include processing the material(s) with the second composite beam (block 396). Processing with the second composite beam can be carried out in real-time, for example, by controlling the location of the second composite beam (sub-block 397), controlling the beam characteristics of the second composite beam (sub-block 398), or controlling the sequencing of the first laser beams (block 399). Controlling the location of the second composite beam (sub-block 397) can include, for example, positioning, steering, or otherwise aligning the second composite beam with target location at the material(s), such as via the positioning optics, positioning modules, and positioning stages described above.

Controlling the beam characteristics of the second beam (sub-block 398) can include, for example, independently modulating one or more of the first laser beams, controlling an operating state of one or more of the first laser beams individually or collectively, controlling an operating power of one or more the first laser beams individually or collectively, or controlling at least one of an on/off/standby state, a pulsing frequency, or a waveform shape of one or more of the first laser beams individually or collectively. Controlling the beam characteristics of the second beam can also include controlling beam composition of the first composite beam by increasing or decreasing the relative contribution of one or more of the first laser beams of the first composite beam. For example, one or more of the first laser beams can be turned on/off (or put in to standby) to increase or decrease the relative contribution of other first laser beams to the first composite beam (and ultimately the second composite beam). As another example, the relative power of one or more of the first laser beams can be increased or decreased to change the composition of the first composite beam.

Controlling the sequencing of the first laser beams (sub-block 399) can include changing one or more beam characteristics of the first laser beams while the second composite beam remains focused at the same target location. The sequencing can also be controlled such that the first laser beams are sequenced when the second composite beam transitions from processing a first material in a combined material to processing a second material in the combined material. For example, if the materials to be processed comprise a printed circuit board, the first laser beams could be sequenced when the second composite beam transitions from a metal layer to a dielectric layer (or vice versa). In some embodiments, sequencing can include detecting a transition between the first material and the second material in the composite material. For example, a sensor or other suitable feedback device or mechanism could detect such a transition so that the second material is not exposed to laser radiation that could damage the second material. In further embodiments, the sequencing could be configured such that the second composite beam $C_2$ gradually sequences between different beam characteristics.

As discussed above, the beam modification optics 20, 120 (FIGS. 1, 2A, and 3A) can modify the wave fronts of the individual laser beams of the second plurality of second laser beams $P_2$, to achieve a certain focal length or spot size of the individual laser beams of the second composite beam $C_2$ when focused. In general, the focal length of the individual laser beams of the second composite beam $C_2$ can vary depending on the wavelengths of the individual beams and the materials of the various optical elements through which the individual beams pass. Without modification at the beam modification optics 120, the individual laser beams of the second composite beam $C_2$ would focus to different focal planes. However, with appropriate divergence/convergence, the individual laser beams of the second composite beam $C_2$ can be modified such that they each focus at the common focusing plane $F_1$. Similarly, the individual laser beams of the second composite beam $C_2$ can be modified to increase the diameter (or spot size) of the individual beams at the common focal plane $F_1$.

Figure 5A:
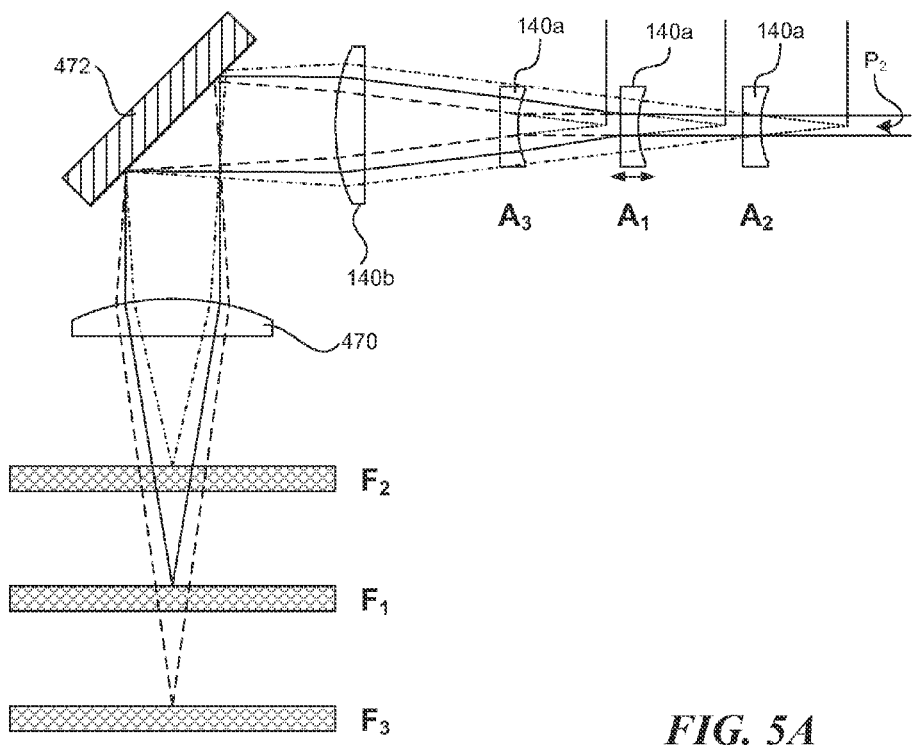
FIGS. 5A and 5B are schematic views showing, respectively, focal length and spot size adjustment via beam modification optics configured in accordance with selected embodiments of the present technology.
Figure 5B:
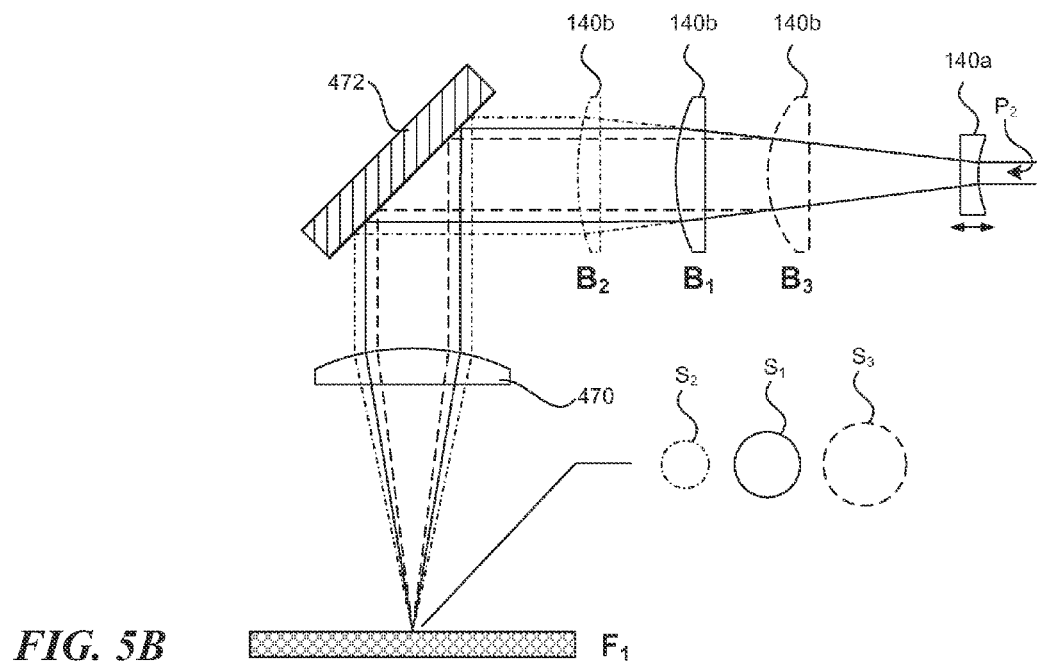

FIGS. 5A and 5B are schematic views showing, respectively, focal length modification and spot size adjustment via the beam modification optics 120 (FIGS. 2A and 3A) in accordance with a selected embodiment of the present technology. Various other features of the systems 100 and 200 of FIGS. 2A and 3A have been omitted from FIGS. 5A and 5B for ease of illustration. Referring first to FIG. 5A, a focus lens 470 and a reflective element 472 are arranged to receive an individual laser beam of the second plurality of second laser beams $P_2$ from first and second lenses 140a and 140b of the beam modification optics 120. At a first position $A_1$, the first lens 140a expands the individual laser beam of the second plurality of second laser beams $P_2$ such that the second lens 140b provides the individual laser beam of the second plurality of second laser beams $P_2$ at the focal plane $F_1$. At a second position $A_2$, the first lens 140a is moved away from the second lens 140b. In this configuration, and relative to the first position $A_1$, the first lens 140a increases the expansion of the individual laser beam of the second plurality of second laser beams $P_2$. Also, at the second position $A_2$ the second lens 140b converges the individual laser beam of the second plurality of second laser beams $P_2$ such that the laser beam focuses at a focal plane $F_2$. At a third position $A_3$, the first lens 140a is moved towards the second lens 140b. In this configuration, and relative to the first position $A_1$, the first lens 140a decreases the expansion of the individual laser beam of the second plurality of second laser beams $P_2$. In addition, at the third position $A_3$ the second lens 140b slightly converges the individual laser beam of the second plurality of second laser beams $P_2$ such that the individual laser beam focuses at a focal plane $F_3$.

In some embodiments, coarse or fine tune adjustment can be made on the fly, such as during laser operation. In these and other embodiments, a focal length adjustment can account for alignment discontinuities, aberrations in optical surfaces, and changes in temperature or other processing conditions. The fine tune adjustment can also be made to account for variations in laser beam quality. As another example, the focal length adjustment can be made after replacing or changing one of the individual laser sources 114 (FIGS. 2A and 3A) for a new or different type of laser source.

FIG. 5B shows spot size adjustment via the first and second lenses 140a and 140b of the beam modification optics 120 with the second lens 140b having different curvatures and positioned in different locations relative to the first lens 140a. In a first configuration $B_1$, the second lens 140b has a curva-ture and a placement that project a focal spot size $S_1$ onto the focal plane $F_1$. In a second configuration $B_2$, the second lens 140b has a curvature and a placement that project a focal spot size $S_2 < S_1$ onto the focal plane $F_1$. In a third configuration $B_3$, the second lens 140b has a curvature and a placement that project a focal spot size $S_3 > S_1$ onto the focal plane $F_1$.

Figure 6:
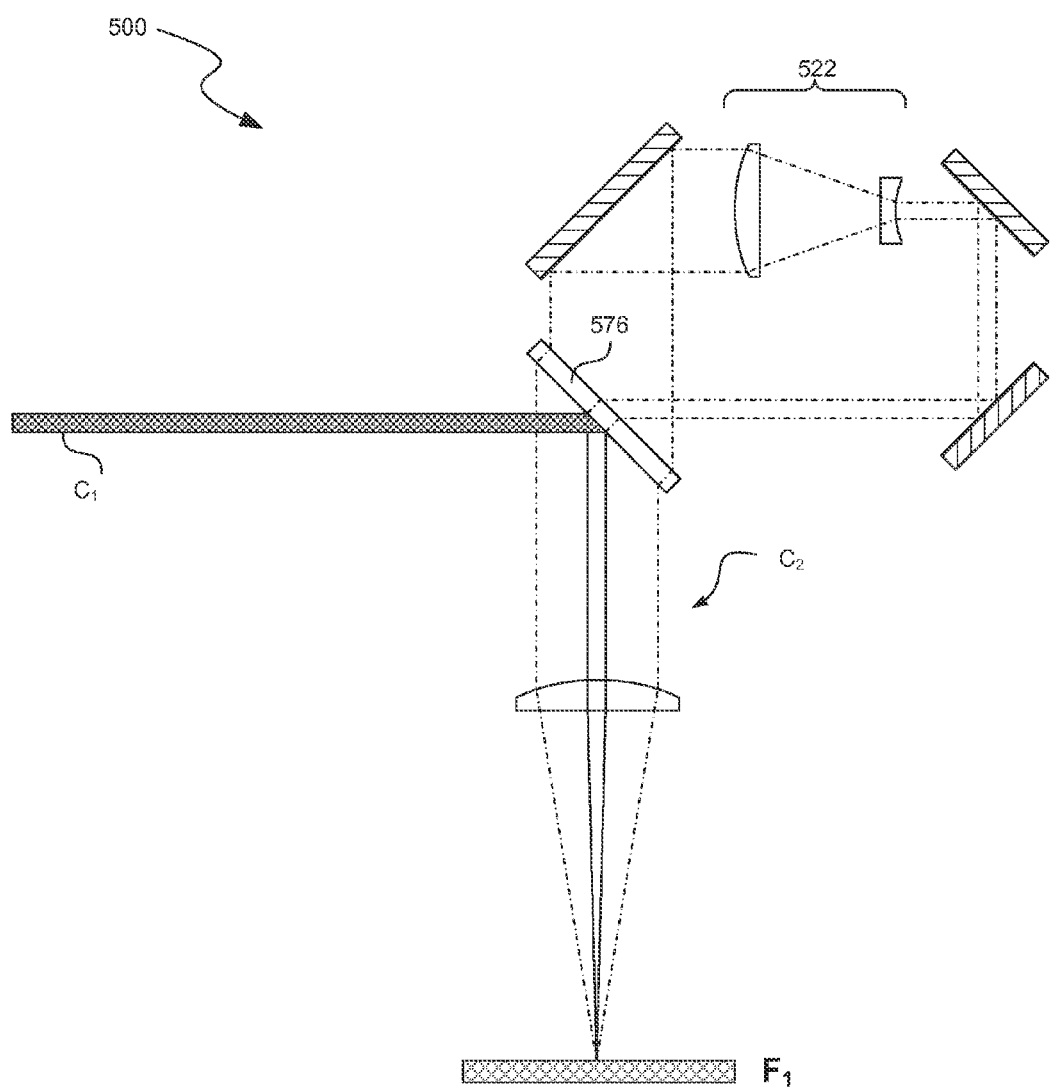
FIG. 6 is a schematic view of recomposition optics employing an optical element for both separating and combining beams configured in accordance with selected embodiments of the present technology.

Systems and methods configured in accordance with embodiments of the present technology can also include other arrangements of components. For example, as shown in FIG. 6, a portion of an optical system 500 can include an optical element 576 (e.g., a reflector/splitter) that is configured for separating the first composite beam $C_1$ and combining individual laser beams via selective transmission and selective reflection. In such an embodiment, the first composite beam $C_1$ can include two individual laser beams of the first plurality of laser beams $P_1$ in which one laser beam is reflected towards the focal plane $F_1$ and the other laser beam is modified by beam modification optics 522. As such, the optical system 500 can be more compact than other optical systems having a larger number of optical elements for providing the same optical functions.

Systems and methods configured in accordance with embodiments for material processing using a combined beam including multiple wavelengths with the focal length and/or spot size of an individual beam being adjustable in real time according to the present technology can provide several advantages over conventional systems. In processing a material comprising mirrored acrylic, for example, a 1.06 micron radiation can be used to remove the metallic mirroring from the back of the acrylic without affecting the acrylic, since acrylic is generally transparent to that wavelength. At the same time, however, a 10.6 micron radiation is readily absorbed into the acrylic and therefore produces a frosted appearance. As such, one wavelength of a laser beam removes the mirroring from the acrylic leaving transparent areas in the mirrored surface, and the other wavelength of laser beam can mark the acrylic with a frosted pattern in portions of the transparent areas. This technique can be used to produce lettering, for example. Moreover, according to embodiments of the present technology, these laser beams of different wavelengths can be applied simultaneously and individually controlled by adjusting or otherwise controlling the proportions of the two wavelengths in the combined beam as needed.

In accordance with additional embodiments of the technology, processing a target material can comprise processing a material to remove a dye from the material. For example, acetal homopolymer having a dye in a portion of the material (e.g., black DELRIN) can readily absorb 10.6 micron radiation to remove material and engrave patterns into the acetal homopolymer. However, 1.06 micron radiation may only be absorbed by the dye in the acetal homopolymer and therefore bleaches the dye without removing any of the other material in the mirrored acrylic. As such, according to embodiments of the present technology, composite laser beams with different constituent wavelengths provide for text or patterns to be engraved into a material and a surface of the patterns (e.g., a bottom surface) to be bleached to create contrast.

Systems and methods in accordance with embodiments of the present technology can include one or more controllers (e.g., controllers 28 of FIG. 1) configured to perform various aspects of the method 390 (FIG. 4) as well as managing operation of the individual laser processing systems 100 and 200. For example, the controllers can be configured to manage the speed of the positioning optics 126, 226 (FIGS. 2A and 3A) as well as power output and laser modulation rate of laser sources 114. For example, the controllers can be configured to independently control, modulate, or otherwise adjust the percentage power of the first composite laser beams $P_1$. More specifically, the controller can control the laser power output of the individual laser sources 104 independently. Moreover, the controller can be configured to control the power of the individual laser beams in real-time during the processing. The method of controlling the power of each laser beam can depend on the type of the individual laser sources 114. In one embodiment, such as an embodiment including a $CO_2$ or gas laser source for example, the power can be controlled by rapidly powering the laser source on and off (or into and out of a stand by state) to obtain an average power. In another embodiment, such as an embodiment including a solid state laser for example, the power can be controlled by modulating the current that is supplied to the laser source. In still further embodiments, the power of the laser source can be controlled by modulating or otherwise controlling the input signal to the laser source. Moreover, a person having ordinary skill in the art will appreciate that the controllers can include a special purpose computer or data processor that can be specifically programmed, configured, or otherwise constructed to perform and/or store one or more computer-executable instructions.

As discussed above, various aspects and implementations of the technology as described herein can be provided automatically or semi-automatically. Although this has been described in the general context of computer-executable instructions, such as routines executed by a general-purpose computer, e.g., a server or personal computer, those having ordinary skill in the art will appreciate that aspects of the technology can be practiced with other computer system configurations, including Internet appliances, set-top boxes, hand-held devices, wearable computers, mobile phones, multiprocessor systems, microprocessor-based systems, minicomputers, mainframe computers, programmable logic controllers, or the like. Aspects of the technology can be embodied in a special purpose computer or data processor that is specifically programmed, configured, or constructed to perform one or more of the computer-executable instructions explained in detail below. Indeed, the terms "computer" or "controller" as used generally herein, refers to any of the above devices as well as any data processor or any device capable of communicating with a network, including consumer electronic goods such as gaming devices, cameras, or other electronics having a data processor and other components, e.g., network communication circuitry. Data processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium or non-transitory medium for data. Software may include one or more program modules which include routines, programs, objects, components, data structures, and so on that perform particular tasks or implement particular abstract data types.

Aspects of the technology can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or subroutines may be located in both local and remote memory storage devices. Aspects of the technology described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those of ordinary skill in the art will recognize that portions of the technology may reside on a server computer, while corresponding portions reside on a client computer. Data structures and transmission of data particular to aspects of the invention are also encompassed within the scope of the technology.

From the foregoing, it will be appreciated that specific embodiments of the disclosure have been described herein for purposes of illustration, but that various modifications may be made without deviating from the spirit and scope of the various embodiments of the disclosure. For example, although many of features of the system are described above with reference to singular components that are illustrated schematically in the Figures, in other embodiments the system can include multiple components. Similarly, while certain features are shown have multiple components, in other embodiments, the system can include more or fewer components than are illustrated. For example, in one embodiment, the laser processing system 114 of FIG. 1 can include three laser sources. Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A laser system for processing one or more materials or combination of materials with composite laser energy, the system comprising:
    one or more laser sources configured to provide a first plurality of first laser beams, with individual first laser beams having beam characteristics that are generally different from corresponding beam characteristics of other individual first laser beams;
    preconditioning optics arranged to combine the first plurality of first laser beams into a first composite beam;
    recomposition optics arranged to separate the first composite beam into a second plurality of second laser beams and combine the second plurality of second laser beams into a second composite beam;
    beam modification optics arranged to modify wave fronts of one or more of the individual second laser beams such that the second composite beam has one or more beam characteristics that are modified relative to corresponding beam characteristics of the first composite beam; and
    focusing optics arranged to focus the second plurality of second laser beams of the second composite beam within a common focusing plane.

2. The system of claim 1 wherein the beam characteristics of the first individual laser beams within the first plurality of first laser beams are generally different from the beam characteristics of other individual first laser beams include at least one of a wavelength or a state of polarization.

3. The system of claim 1 wherein the beam characteristics of the individual first laser beams within the first plurality of first laser beams that are generally different from the beam characteristics of other individual first laser beams include at least one of a beam diameter, a power, a pulsing frequency, or a waveform shape.

4. The system of claim 1 wherein the preconditioning optics combine one or more of the individual first laser beams of the first plurality of first laser beams via selective transmission or selective reflection.

5. The system of claim 4 wherein the preconditioning optics include one or more optical elements configured to selectively direct one or more of the individual first laser beams of the first plurality of first laser beams via wavelength differentiation.

6. The system of claim 4 wherein the preconditioning optics include one or more optical elements configured to selectively direct one or more of the individual first laser beams of the first plurality of first individual laser beams based on polarization state.

7. The system of claim 4 wherein the preconditioning optics include one or more multichroic elements.

8. The system of claim 1 wherein the preconditioning optics form the first composite beam generally concentric with the first laser beams of the first plurality of first laser beams, wherein a diameter of the first composite beam is generally equal to the largest beam diameter of the first laser beams.

9. The system of claim 1 wherein the preconditioning optics expand, reduce, or collimate one or more of the individual first laser beams of the first plurality of first laser beams.

10. The system of claim 1 wherein the preconditioning optics provide the first composite beam as a collimated beam.

11. The system of claim 1 wherein the recomposition optics are configured to:
selectively reflect or selectively transmit the first composite beam; or
selectively reflect or selectively transmit one or more of the second individual laser beams of the second plurality of second laser beams.

12. The system of claim 11 wherein the recomposition optics include one or more optical elements configured to selectively direct one or more of the individual first laser beams of the first composite beam or one or more of the second individual laser beams of the second plurality of second laser beams via wavelength differentiation.

13. The system of claim 11 wherein the recomposition optics include one or more optical elements configured to selectively direct one or more of the individual first laser beams of the first plurality of first laser beams or one or more of the individual second laser beams of the second plurality of second laser beams based on polarization state.

14. The system of claim 11 wherein the recomposition optics include one or more multichroic elements.

15. The system of claim 1 wherein the beam modification optics expand, reduce, or collimate one or more of the individual second laser beams of the second plurality of second laser beams.

16. The system of claim 15 wherein the beam modification optics converge or diverge the one or more of the individual second laser beams of the second plurality of second laser beams.

17. The system of claim 15 wherein the beam modification optics increase or decrease a beam size of one or more of the individual second laser beams of the second plurality of second laser beams.

18. The system of claim 1 wherein the focusing optics focus the individual second laser beams of the second composite beam at one or more materials to be processed at the common focusing plane.

19. The system of claim 1 wherein the focusing optics comprise at least one of a plano-convex lens, a meniscus lens, a focusing reflective element, or an assembly of lenses and/or reflective elements.

20. The system of claim 1, further comprising alignment optics that direct one or more of the individual second laser beams of the second plurality of second laser beams along one or more optical path that extend from the recomposition optics, to the modification optics, and back to the recomposition optics.

21. The system of claim 1, further comprising positioning optics that guide the first composite beam or the second composite beam over a variable optical path.

22. The system of claim 21 wherein the positioning optics further comprise a linear or multi-dimensional positioning module having one or more reflective elements attached to the positioning module.

23. The system of claim 21 wherein the positioning optics further comprise a scanning galvanometer.

24. The system of claim 1, further comprising a positioning stage having one or more linear or rotational components that move materials to be processed into target positions in line with the second composite beam.

25. The system of claim 1, further comprising one or more controllers operably coupled to the laser sources to provide independent modulation of one or more of the individual first laser beams of the first plurality of first laser beams.

26. The system of claim 1, further comprising one or more controllers operably coupled to the laser sources to control an operating power of one or more of the individual first laser beams of the first plurality of first laser beams individually or collectively.

27. The system of claim 1, further comprising one or more controllers operably coupled to the laser sources to control at least one of an on/off state, a pulsing frequency, or a waveform shape of one or more of the individual first laser beams of the first plurality of first laser beams individually or collectively.

28. The system of claim 1, further comprising at least one controller operably coupled to the laser sources to control beam composition of the first composite beam by increasing or decreasing the relative beam contribution of one or more of the individual first laser beams of the first plurality of first laser beams.

29. The system of claim 1, further comprising at least one controller operably coupled to the laser sources to controls beam sequencing of one or more of the individual first laser beams of the first plurality of first laser beams.

30. A method for processing one or more materials or combination of materials with composite laser energy, comprising:
forming a first composite beam by combining a first plurality of first laser beams from one or more laser sources, wherein individual first laser beams have beam characteristics that are generally different from corresponding beam characteristics of other individual first laser beams;
separating the first composite beam into individual laser beams to form a second plurality of second laser beams;
modifying wave fronts of one or more of the individual second laser beams;
combining the individual second laser beams, including the individual second beams with modified wave fronts, into a second composite beam having one or more modified beam characteristics that are different than corresponding characteristics of the first composite beam; and focusing the individual second laser beams of the second composite beam within a common focusing plane at materials to be processed.

31. The method of claim 30 wherein modifying the wave fronts of the laser beams of the second plurality of second laser beams comprises expanding, reducing, or collimating individual second laser beams of the second plurality of second laser beams.

32. The method of claim 30, further comprising independently modulating one or more of the individual first laser beams of the first plurality of first laser beams.

33. The method of claim 30, further comprising controlling an operating state of one or more of the individual first laser beams of the first plurality of first laser beams individually or collectively.

34. The method of claim 30, further comprising controlling an operating power of one or more the individual first laser beams of the first plurality of first laser beams individually or collectively.

35. The method of claim 30, further comprising controlling at least one of an on/off/standby state, a pulsing frequency, or a waveform shape of one or more of the individual first laser beams of the first plurality of first laser beams individually or collectively.

36. The of method of claim 30, further comprising controlling beam composition of the first composite beam by increasing or decreasing the relative contribution of one or more of the individual first laser beams of the first composite beam.

37. The method of claim 30, further comprising controlling beam sequencing of one or more of the individual first laser beams of the first plurality of first laser beams.

38. The method of claim 37 wherein controlling the beam sequencing comprises changing one or more beam characteristics of one or more of the individual first laser beams of the first plurality of first laser beams.

39. The method of claim 37 wherein controlling the beam sequencing comprises changing the on/off/standby state of one or more of the individual first laser beams of the first plurality of first laser beams.

40. The method of claim 30, further comprising controlling the beam sequencing in response to the second composite beam transitioning from processing a material in a combination of materials to processing another material in the combination of materials.

41. The method of claim 30, further comprising detecting during processing a transition between different materials in a combination of materials.

* * * * *